(12) United States Patent
Kim et al.

(10) Patent No.: US 7,145,763 B2
(45) Date of Patent: Dec. 5, 2006

(54) HIGH-VOLTAGE ELECTRIC DOUBLE LAYER CAPACITOR

(75) Inventors: Yu-Tack Kim, Gyeonnggi-do (KR);
Moon-Bae Lee, Gyeonggi-do (KR);
Sang-Hyun Lee, Seoul (KR); Sang-Ick Lee, Seoul (KR); Chul-Wan Park, Seoul (KR); Jin-Bae Park, Seoul (KR);
Kwang-Chul Roh, Gyeonggi-do (KR);
Jin-Hyoung Son, Seoul (KR);
Seung-Hwan Song, Seoul (KR)

(73) Assignee: Korchip Co., Ltd., Seoul (KR)

( * ) Notice: Subject to any disclaimer, the term of this patent is extended or adjusted under 35 U.S.C. 154(b) by 0 days.

(21) Appl. No.: 11/240,373

(22) Filed: Oct. 3, 2005

(65) Prior Publication Data

US 2006/0221551 A1   Oct. 5, 2006

(30) Foreign Application Priority Data

Mar. 31, 2005   (KR) ...................... 10-2005-0027201

(51) Int. Cl.
*H01G 9/00* (2006.01)
*H01G 9/02* (2006.01)
(52) U.S. Cl. ...................................... 361/502; 361/512
(58) Field of Classification Search ................ 361/502, 361/508–512, 516; 29/25.03
See application file for complete search history.

(56) References Cited

U.S. PATENT DOCUMENTS 5,150,283 A * 9/1992 Yoshida et al. ............. 361/502
6,097,587 A * 8/2000 Inagawa et al. ............ 361/502
6,310,760 B1 * 10/2001 Shaw et al. ................. 361/314
6,881,232 B1 * 4/2005 O'Phelan et al. .......... 29/25.03

FOREIGN PATENT DOCUMENTS

KR   0159830   12/1998

* cited by examiner

*Primary Examiner*—Eric W. Thomas
(74) *Attorney, Agent, or Firm*—Jenkens & Gilchrist

(57) ABSTRACT

The present invention relates to a high-voltage electric double layer capacitor (EDLC), and more particularly, to an EDLC in which a surge voltage and an operating voltage are enhanced by improving the structure of a unit cell. The EDLC according to the present invention includes a unit cell having at least three electrodes. According to a preferred embodiment of the present invention, the unit cell has a structure constructed by sequentially laminating a first insulating paper layer with a sheet of insulating paper, a first electrode layer with at least two electrodes, a second insulating paper layer with a sheet of insulating paper, and a second electrode layer with at least one electrode. In accordance with the present invention, the number of electrode-facing surfaces increases, and a surge voltage and an operating voltage increase in proportion to the increased number of the electrode-facing surfaces, resulting in a high energy storage density. Accordingly, the present invention has advantages in that an EDLC with a single cell can be applied to products, an EDLC module can be miniaturized, and there is no need for a protection circuit for maintaining voltage balance on a unit cell basis upon fabrication of the module.

6 Claims, 9 Drawing Sheets

CV curve of cell of Example 3

HIGH-VOLTAGE ELECTRIC DOUBLE LAYER CAPACITOR

BACKGROUND OF THE INVENTION

1. Field of the Invention

The present invention relates to a high-voltage electric double layer capacitor (EDLC), and more particularly, to an EDLC in which a surge voltage and an operating voltage are enhanced by improving the structure of a unit cell.

2. Description of the Related Art

An EDLC is an energy storage medium in which two electrodes of the anode and the cathode are arranged opposite to each other with insulating paper interposed therebetween so that a pair of charge layers (electric double layers) having different signs can be generated on facing surfaces of the electrodes. The EDLC can be continuously charged and discharged. This EDLC is mainly used as an auxiliary power supply, an IC backup power supply or the like for a variety of electrical and electronic devices. Recently, the EDLC has been widely used for a toy, an industrial power supply, an uninterrupted power supply (UPS), solar energy storage, HEV/EV sub power, and the like.

The EDLC is generally fabricated by accommodating a unit cell in a casing and then filling the casing with an electrolyte. At this time, the unit cell is constructed by alternately laminating electrodes and sheets of insulating paper and forming them into a roll. In order to establish a proper voltage and capacitance required for an EDLC, two or more unit cells are connected in series and in parallel to form the EDLC. This will be described in detail below with reference to FIGS. 1 to 4. FIG. 1 is a sectional view showing a laminate structure of a unit cell according to a prior art. FIG. 2 is a perspective view illustrating a state where the unit cell shown in FIG. 1 is wound. FIG. 3 is a perspective view illustrating a state where the unit cell shown in FIG. 1 is compressed. FIG. 4 is a sectional schematic view showing the distribution and polarized state of charges in the unit cell shown in FIG. 1.

Referring to FIGS. 1 and 2, the conventional unit cell includes two sheets of insulating paper 1a and 1b and two electrodes 2a and 2b. In this case, the electrodes 2a and 2b and the sheets of insulating paper 1a and 1b are alternately laminated to insulate the two electrodes 2a and 2b from each other, and the laminate is then rolled. That is, according to the prior art, the unit cell is constructed by sequentially laminating a first insulating paper layer 1A with a sheet of insulating paper 1a, a first electrode layer 2A with one electrode 2a, a second insulating paper layer 1B with a sheet of insulating paper 1b, and a second electrode layer 2B with one electrode 2b, as shown in FIG. 1.

The laminate thus constructed is rolled as shown in FIG. 2 to form the unit cell. At this time, the electrodes 2a and 2b have positive polarity (+) or negative polarity (−) determined according to the sign of external electricity applied thereto. Terminals 2a' and 2b' to which external electricity is applied are drawn from the electrodes 2a and 2b.

FIG. 4 shows that the first electrode layer 2A has negative polarity (−) and the second electrode layer 2B has positive polarity (+).

The unit cell rolled as such may be generally contained directly in a cylindrical case, or in a polygonal or bag-shaped (usually, pouch-shaped) case if it is compressed as shown in FIG. 3.

As described above, the conventional unit cell is constructed to have the two electrodes 2a and 2b. That is, the unit cell is constructed to have the first electrode layer 2A and the second electrode layer 2B, wherein each of the electrode layers comprises one electrode and the electrodes of the unit cell comprise the two electrodes 2a and 2b as the anode (+) and the cathode (−). Further, the unit cell has charge distribution as shown in FIG. 4. In the unit cell, positive (+) charges and negative (−) charges are polarized in the first electrode layer 2A and the second insulating paper layer 1B, and in the second insulating paper layer 1B and the second electrode layer 2B. Accordingly, two charge layers (electric double layers) are formed in a single unit cell.

In the conventional unit cell constructed as above, however, a surge voltage is low, i.e., less than 3.0V, and an operating voltage is also low, i.e., 2.3V to 2.7V. Therefore, there is a problem in that two or more unit cells have to be connected in series in order to establish an operating voltage applicable to electronic products.

The EDLC has the area of facing surfaces (specific surface area) increased with the use of activated carbon electrodes, and capacitance improved with the use of an electrolyte, as compared with existing other capacitors. As described above, the EDLC has the two sheets of insulating paper 1a and 1b for separating the two opposite electrodes 2a and 2b. In particular, a cylindrical unit cell to which the roll shape shown in FIG. 2 is applied is obtained by rolling the laminate such that the electrodes face each other in both the front and rear of them to improve capacitance. This can be considered to increase the area of facing surfaces. This can increase capacitance as expressed by the following equation, but has nothing to do with increase in voltage:

$$C = \epsilon \cdot S / d$$

where C: capacitance, $\epsilon$: dielectric constant, S: cross section of electrode, and d: distance between opposite electrodes.

Furthermore, the EDLC, which is an energy storage medium enabling instant charge/discharge, has a superior output characteristic to that of a battery but has a low voltage per unit cell since its voltage gradually drops simultaneously with discharge. Therefore, the EDLC has an energy storage density smaller than that of the battery. Accordingly, the EDLC is generally used for an auxiliary power supply for the output of a battery, and an auxiliary power supply for other electrical and electronic devices.

Most of electronic products including ICs and backup power supply products have an operating voltage of 1.8V or more, preferably a wide voltage range of 3V to 48V (in case of electric cars). Accordingly, in order for the EDLC to be used for these products, two or more unit cells are serially connected to increase the operating voltage to at least 5V. In order for the EDLC to be used for industrial apparatuses, electric cars and UPSs, 10 to 100 unit cells are connected in series/parallel to a range of 10V to 48V.

However, in the case where two or more unit cells (each 3.0V or less) are serially connected to increase the operating voltage of a capacitor, there is another problem in that a balance problem between the unit cells, which inevitably occurs, should be solved. Specifically, there is a need for a voltage balance protection circuit such as a resistor, a diode and another IC so that the overall operating voltage of the capacitor is not concentrated on one unit cell, in consideration of the capacitance of the unit cell, equivalent serial resistance (ESR), a leakage current and the like of a unit cell. At this time, a more important fact is that the aforementioned packaging has to be formed such that the overall operating voltage is significantly lower than the operating voltage of each unit cell by adding about one unit cell in order to give a margin for the overall operating voltage. That is, for the purpose of stable operation, a module should be fabricated to have a voltage of about 2.0V per cell.

Meanwhile, in an energy storage medium, a unique value is used to indicate the amount of energy that can be stored therein. In case of a battery, 1 AH (storage capacity capable of supporting the use of a current of 1 A for an hour) is used to indicate the amount of energy. In case of an EDLC, however, F (Farad) is used. Since the voltage of the EDLC varies simultaneously with discharge, F is used in accordance with the capacitance notation of a general condenser (capacitor).

Furthermore, an ultra-high capacitance EDLC has a capacitance that is one thousand to one million times larger than that of a general condenser with capacitance on the order of mF, uF or the like. However, a conventional EDLC has an operating voltage that is significantly lower than that of an existing battery or condenser, as described above.

The energy storage amount that is a piece of data related to energy storage can be considered as a good index useful for comparison of the amount of energy even in the EDLC, in the same manner as a battery and a condenser. The energy storage amount can be obtained by the following equation:

Largest energy storage amount $(J) = \frac{1}{2} CV^2$ where C is capacitance per cell (F) and V is a voltage applicable to a cell.

From the above equation, it can be seen that the largest energy storage amount is proportional to capacitance but is proportional to the square of voltage. In order words, if the voltage increases twice for the same area, the largest energy storage amount increases four times. If the capacitance increases twice, however, the largest energy storage amount increases twice. Accordingly, it can be said that the best way to increase the value of the largest energy storage amount available in an EDLC is to increase the voltage.

As described above, however, in the prior art, unit cells are serially connected to increase an operating voltage. This method has a problem in that a high voltage is applied to any one of the unit cells since voltage balance among the unit cells is broken due to repeated cycles in the capacitance of a unit cell, a capacitance change rate, an ESR, a resistance changing rate, a leakage current, and a leakage current change rate. This causes an electrolyte to be dissolved (the electrolyte is dissolved when a voltage of 3.0V or more is applied thereto). It also results in increased internal resistance, lowered capacitance, and the like.

Therefore, it can be said that increase in a surge voltage and an operating voltage of an EDLC is the most important technical problem to be solved in the art. In this case, it is necessary to guarantee physical properties of the EDLC, such as internal resistance, capacitance, rapid charge/discharge, and instant high output.

SUMMARY OF THE INVENTION

The present invention is conceived to solve the aforementioned problems in the prior art. An object of the present invention is to provide a high-voltage EDLC that has a high energy density and a superior charge/discharge characteristic by constructing a unit cell to have the increased number of electrodes therein to improve a surge voltage and an operating voltage.

According to the present invention for achieving this object, there is provided an EDLC having a unit cell constructed by alternately laminating electrodes and sheets of insulating paper, wherein the electrodes are at least 3 in number.

Specifically, the EDLC of the present invention has at least one unit cell, and the unit cell has at least three electrodes.

The present invention is characterized in that the number of electrodes within the unit cell is increased to increase the number of electrodes and facing surfaces of the electrodes. According to the present invention, the increased electrodes serve as bridges to serially connect the electrodes within the unit cell, thereby increasing a surge voltage and an operating voltage. Furthermore, even though a high voltage of 3.0V or more is applied to the unit cell, the voltage is distributed within the unit cell and thus an electrolyte is not dissolved. Accordingly, the unit cell has an increased surge voltage and operating voltage, a high energy storage density, and a superior charge/discharge characteristic. Furthermore, as the unit cell has a high operating voltage, the EDLC of the present invention can be fabricated as a single cell. If the EDLC is fabricated as a single cell, a manufacturing process can be simplified and the EDLC can be miniaturized.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1:
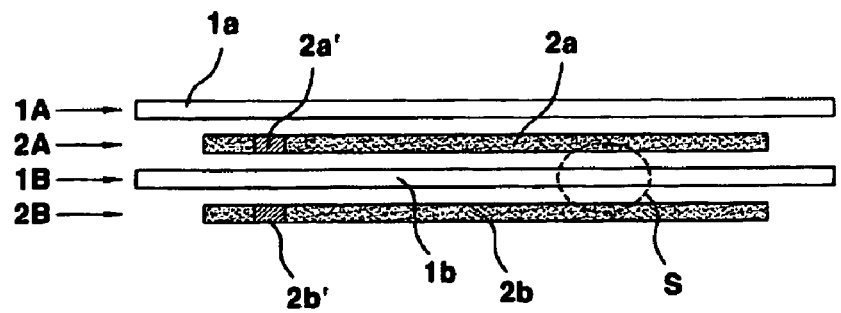
FIG. 1 is a sectional view showing a laminate structure of a unit cell of a conventional EDLC.
Figure 2:
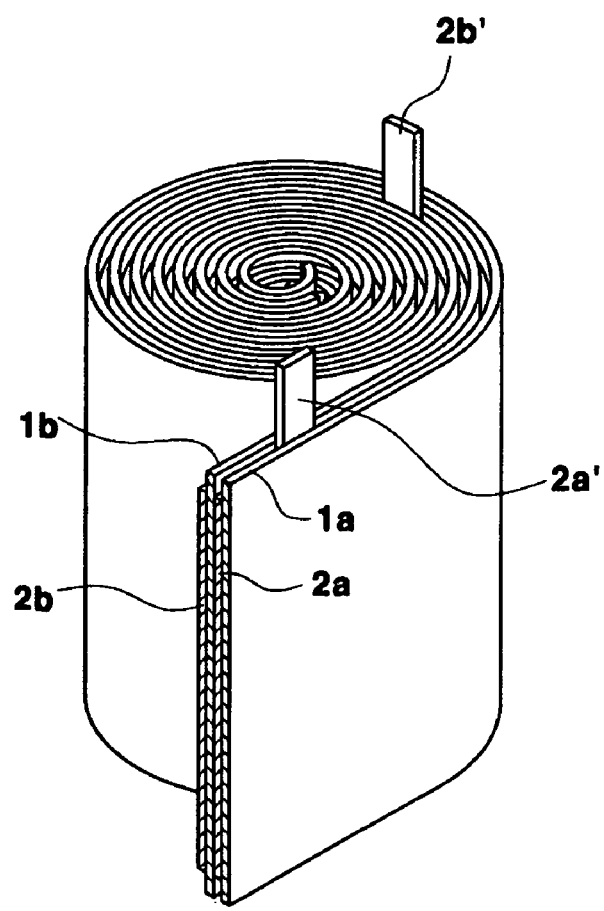
FIG. 2 is a perspective view illustrating a state where the unit cell shown in FIG. 1 is wound.
Figure 3:
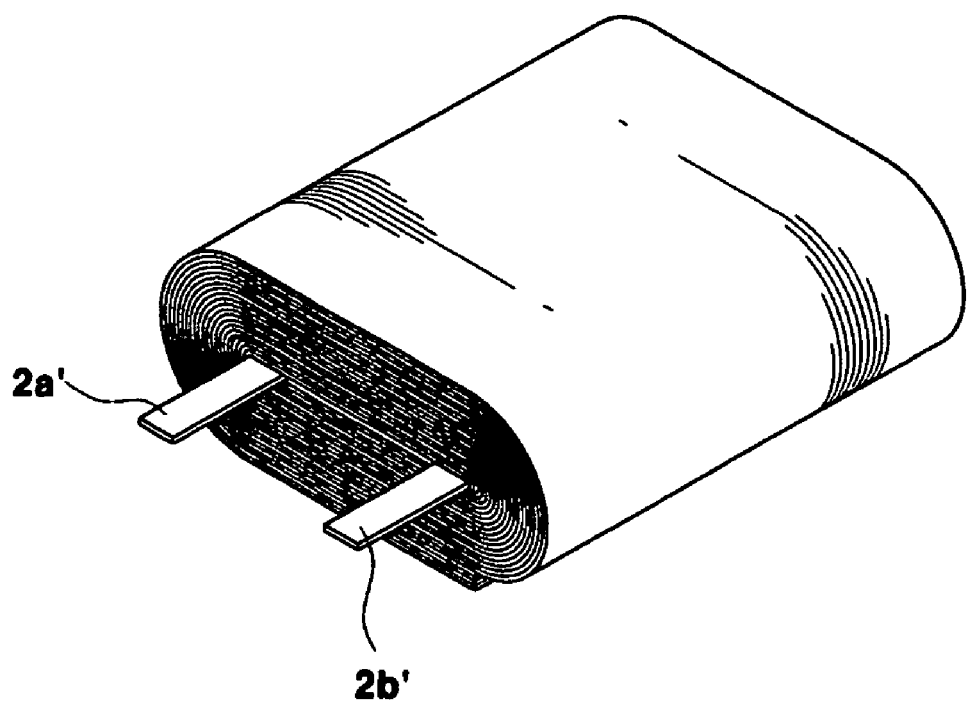
FIG. 3 is a perspective view illustrating a state where the unit cell shown in FIG. 1 is compressed.

Hereinafter, the present invention will be described in detail with reference to the accompanying drawings. The accompanying drawings illustrate preferred embodiments of the present invention. They illustrate a variety of embodiments of a unit cell of an EDLC according to the present invention.

The EDLC of the present invention comprises a unit cell. The unit cell comprises insulating paper layers 10A and 10B, and electrode layers 20A and 20B, which are alternately laminated. The unit cell has at least three electrodes 21, 22, 23, 24 and 25. So far as a unit cell of the EDLC has three or more electrodes 21 to 25, it falls within the scope of the present invention.

According to a preferred embodiment of the present invention, the unit cell has a structure constructed by sequentially laminating a first insulating paper layer 10A with a sheet of insulating paper 11, a first electrode layer 20A with at least two electrodes 21 to 25, a second insulating paper layer 10B with a sheet of insulating paper 12, and a second electrode layer 20B with at least one electrode 21 to 25.

Alternatively, the unit cell may have a structure constructed by sequentially laminating a first insulating paper layer 10A with a sheet of insulating paper 11, a first electrode layer 20A with at least one electrode 21 to 25, a second insulating paper layer 10B with a sheet of insulating paper 12, and a second electrode layer 20B with at least two electrodes 21 to 25.

Specifically, the two or more electrodes 21 and 22 are arranged parallel to each other in the first electrode layer 20A at a predetermined interval, or the two or more electrodes 23, 24 and 25 are arranged parallel to one another in the second electrode layer 20B at a predetermined interval. Accordingly, at least three electrodes 21 to 25 are disposed within a single unit cell. Thus, there are at least two electrode-facing surfaces S of the electrodes 21 to 25 and the electrodes 21 to 25 which are opposite to each other.

Figure 5:
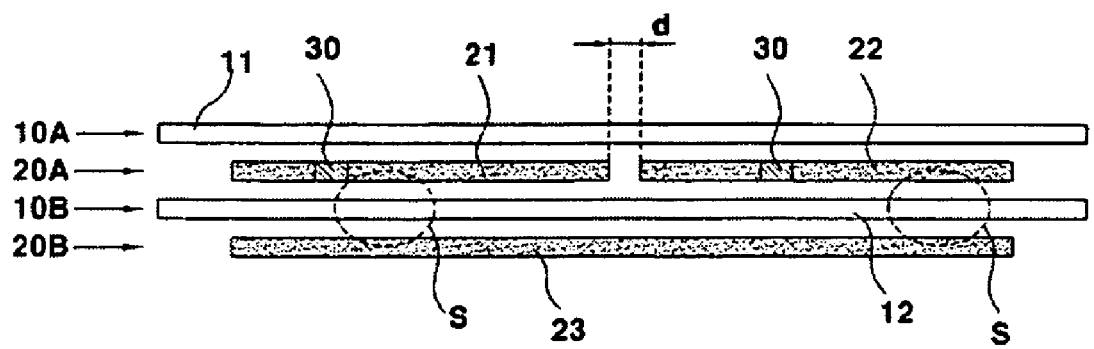
FIG. 5 is a sectional view showing a laminate structure of a unit cell of an EDLC according to a first embodiment of the present invention.

FIG. 5 shows a unit cell according to a first embodiment of the present invention, wherein a laminate structure of the unit cell has three electrodes 21, 22 and 23. That is, the laminate structure of the unit cell according to the first embodiment of the present invention is a structure constructed by sequentially laminating a first insulating paper layer 10A with a sheet of insulating paper 11, a first electrode layer 20A in which two electrodes 21 and 22 are arranged parallel to each other at a predetermined interval, a second insulating paper layer 10B with a sheet of insulating paper 12, and a second electrode layer 20B with an electrode 23, as shown in FIG. 5.

Furthermore, if one electrode is further added to the first electrode layer 20A shown in FIG. 5 and the three electrodes are arranged parallel to one another at a predetermined interval, the unit cell of the present invention has four electrodes.

Figure 6:
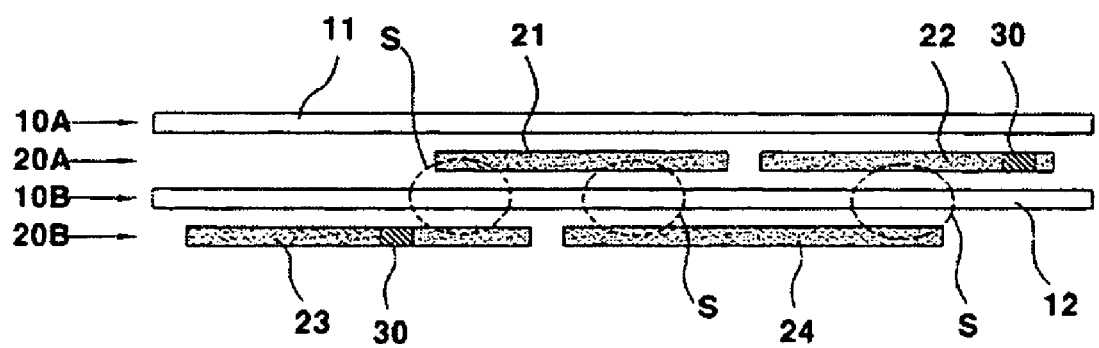
FIG. 6 is a sectional view showing a laminate structure of a unit cell of an EDLC according to a second embodiment of the present invention.

FIG. 6 shows a unit cell according to a second embodiment of the present invention, wherein a laminate structure of the unit cell has four electrodes 21, 22, 23 and 24. In other words, the laminate structure of the unit cell according to the second embodiment of the present invention is a structure constructed by laminating a first insulating paper layer 10A with a sheet of insulating paper 11, a first electrode layer 20A in which two electrodes 21 and 22 are arranged parallel to each other at a predetermined interval, a second insulating paper layer 10B with a sheet of insulating paper 12, and a second electrode layer 20B in which two electrodes 23 and 24 are arranged parallel to each other at a predetermined interval, as shown in FIG. 6.

Figure 7:
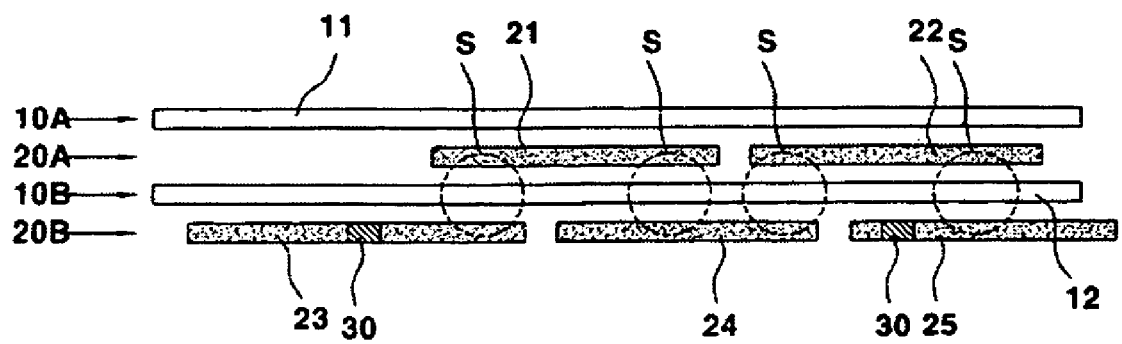
FIG. 7 is a sectional view showing a laminate structure of a unit cell of an EDLC according to a third embodiment of the present invention.

FIG. 7 shows a unit cell according to a third embodiment of the present invention, wherein a laminate structure of the unit cell has five electrodes 21, 22, 23, 24 and 25. In other words, the laminate structure of the unit cell according to the third embodiment of the present invention is a structure constructed by laminating a first insulating paper layer 10A with a sheet of insulating paper 11, a first electrode layer 20A in which two electrodes 21 and 22 are arranged parallel to each other at a predetermined interval, a second insulating paper layer 10B with a sheet of insulating paper 12, and a second electrode layer 20B in which three electrodes 23, 24 and 25 are arranged parallel to one another at a predetermined interval, as shown in FIG. 7.

As described above in connection with the embodiments, the unit cell of the present invention includes at least three electrodes 21 to 25, but the positions of the electrodes 21 to 25 can be designed in various manners. That is, two or more electrodes 21 to 25 are arranged parallel to each other in one of the first and second electrode layers 20A and 20B. Thus, the number of electrodes 21 to 25 arranged in a single unit cell is 3 or more.

At this time, the interval d between the electrodes 21 to 25 that are arranged parallel to each other is preferably 0.5 mm to 20 mm. That is, for example, referring to FIG. 5, there is shown two electrodes 21 and 22 arranged parallel to each other in the first electrode layer 20A. It is preferred that the electrode 21 and the electrode 22 be spaced apart from each other at an interval d of 0.5 mm to 20 mm.

The unit cell with the laminate structure constructed above according to the present invention is rolled and then accommodated in a cylindrical, polygonal or bag-shaped (usually, pouch-shaped) casing, and subsequently impregnated with an electrolyte.

In the present invention, the sheets of insulating paper 11 to 13, the electrodes 21 to 25 and the electrolyte can be conventional ones. Activated carbon-based electrodes can be usefully employed as the electrodes 21 to 25 in the present invention. In this case, the activated carbon-based electrodes include a sheet type of electrode fabricated by drawing and rolling a typical activated carbon-based electrode active material (a mixture of active carbon, a binder, a conductive agent and the like), and a type of electrode fabricated by coating an electrode active material on metal foil (e.g., aluminum foil) and drying them. At this time, in case of the use of an electrode in which an electrode active material is coated on metal foil, it is preferred that the electrode be a double-sided electrode in which the electrode active material is coated on both surfaces of the metal foil.

The unit cell of the present invention has at least three electrodes 21 to 25 and thus has at least two electrode-facing surfaces S.

Specifically, in the unit cell shown in FIG. 5, the electrode 23 faces the electrode 21 as well as the electrode 22. Accordingly, the unit cell shown in FIG. 5 has two electrode-facing surfaces S. At this time, the electrode 23 of the electrodes 21 to 23 serves as a bridge electrode (an electrode for connecting the facing surfaces to each other due to the generation of polarization of charges without drawing a terminal therefrom). The electrode 23 serially connects the electrodes 21 and 22 to each other.

Furthermore, in the unit cell shown in FIG. 6, the electrodes 21 and 23 face each other, and the electrode 21 also face the electrode 24. Further, the electrode 24 also faces the electrode 22. Accordingly, the unit cell shown in FIG. 6 has three electrode-facing surfaces S. At this time, the electrodes 21 and 24 in FIG. 6 serve as bridge electrodes.

The unit cell shown in FIG. 7 has four electrode-facing surfaces S. The electrodes 21, 22 and 24 serve as bridge electrodes.

Figure 4:
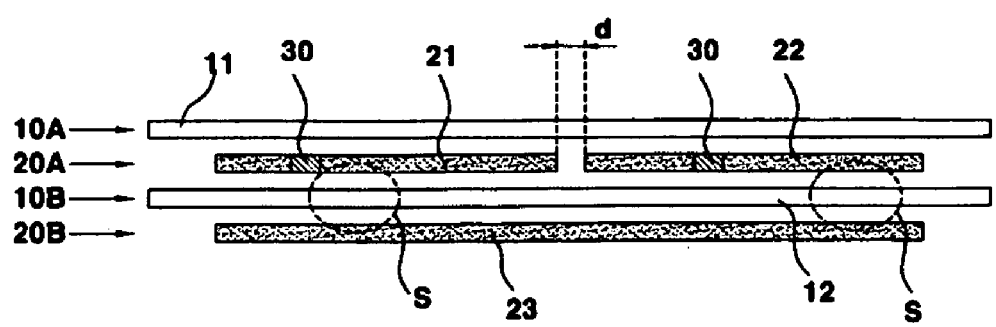
FIG. 4 is a sectional schematic view showing the distribution and polarized state of charges in the unit cell shown in FIG. 1.
Figure 8:
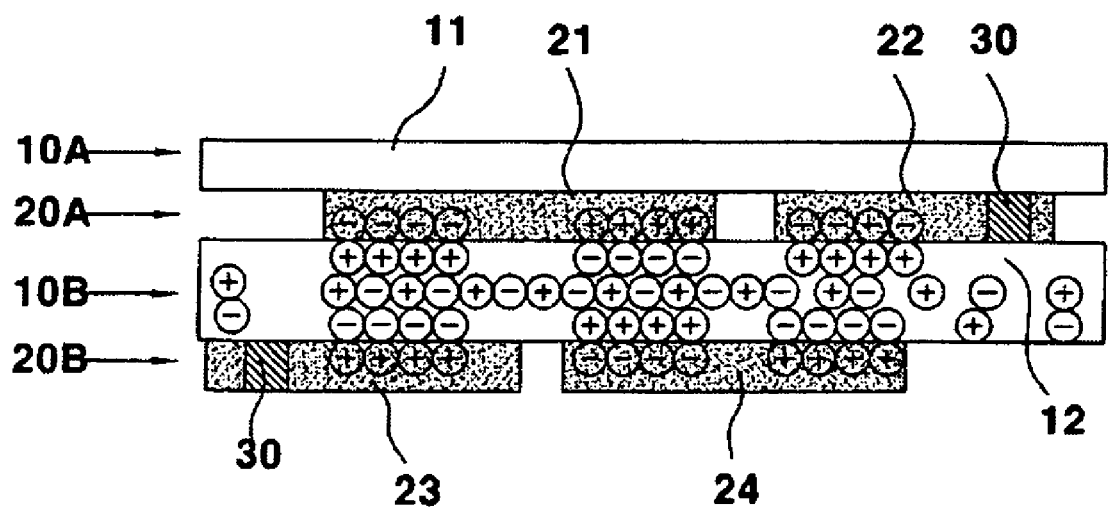
FIG. 8 is a sectional schematic view showing the distribution and polarized state of charges in the unit cell of the EDLC according to the second embodiment of the present invention.

FIG. 8 is a sectional schematic view showing the distribution and polarized state of charges in the unit cell shown in FIG. 6. Referring to FIG. 8, four or more charge layers (electric double layers) are generated in the unit cell of the present invention. That is, in a conventional unit cell, two charge layers are formed since the unit cell has one electrode-facing surface S as shown in FIG. 4. In the unit cell of the present invention, however, four or more charge layers are formed since the unit cell has two or more electrode-facing surfaces S. FIG. 8 shows a state where six charge layers are formed.

In the figures, reference numeral 30 that has not been explained indicates terminals drawn from the electrodes 21 to 25. The positions of the terminals 30 are the most important factor to determine a voltage. The positions of the terminals 30 should be at the first electrode and the last electrode which are either the anode or the cathode and to which electric power is applied. In other words, referring to FIG. 8, if one electrode (the first electrode) is determined as the anode or the cathode, charge distribution in the electrode-facing surfaces S is calculated to determine an electrode (the last electrode) with an opposite sign. FIG. 8 shows that the electrode 23 is determined as the anode (+) and the electrode 22 is determined as the cathode (−) according to charge distribution.

According to the present invention, when the number of electrodes 21 to 25 increases, the number of electrode-facing surfaces S increases and charge layers also increase. This results in increases in the surge voltage and the operating voltage of a unit cell.

More specifically, referring to FIG. 8, the unit cell of the present invention has the electrodes in which electric charges are polarized laterally as well as vertically. In FIG. 8, this is true to the electrodes 21 and 24. Accordingly, voltage polarization increases, and the respective electrodes are connected in series through the bridge electrodes.

That is, in the unit cell of the present invention, since the electrodes 21 to 25 within the unit cell are serially connected through the bridge electrodes, a voltage increases in proportion to the numbers of the electrodes 21 to 25 and the electrode-facing surfaces S. For example, in the conventional unit cell with one electrode-facing surface S, the voltage is 3.0V or less. In the present invention, however, as the number of the electrodes 21 to 25, i.e., the number of the designed electrode-facing surfaces S increases, the voltage increases up to 5.0V, 7.0V, . . . , NV.

In addition, in the unit cell of the present invention, the surge voltage is high and the voltage is distributed within the unit cell. Therefore, even though a high voltage of 3.0V or more is applied to the unit cell, an electrolyte is not dissolved.

Furthermore, according to the present invention, since the voltage of the unit cell is increased, the unit call has a high energy storage amount. In other words, since the energy storage amount is proportional to the square of voltage, the unit cell of the present invention can have a high energy storage amount proportional to an increase in voltage (energy storage amount=½ CV$^2$, where C=capacitance (F) and V=voltage)

For example, the largest energy storage amount at 2.5V and 10 F can be expressed as 31.25 J. If the voltage increases twice according to the present invention, the largest energy storage amount becomes 125 J, which can implement the largest energy storage amount that is remarkably improved as compared with 62.5 J resulting from doubled capacitance.

The EDLC according to the present invention can have one, or two or more unit cells described above. At this time, if the EDLC has two or more unit cells, connection among the unit cells is made through serial connection, parallel connection, or combined serial/parallel connection.

Furthermore, as the unit cell has a high surge voltage and energy storage density, the EDLC according to the present invention can be constructed of one unit cell (single cell). In constructing the unit cell, the unit cell can have a high surge voltage according to the number of the electrodes 21 to 25. If an EDLC is constructed of one unit cell (single cell) as such, it is possible to eliminate the process of serially connecting two or more unit cells in the prior art for enabling the EDLC to be used for an IC, a backup power supply or an electric car, thereby simplifying a manufacturing process.

Furthermore, according to the present invention, the number of the electrodes 21 to 25 within one unit cell is preferably 10 or less in consideration of capacitance and a limited size. If the number of the electrodes 21 to 25 increases, it is possible to obtain an advantage related to an increase in voltage. If a unit cell is designed such that the number of the electrodes 21 to 25 is greater than 10, however, a leakage current may increase, thereby causing loss of stored energy and obstructing the stabilized use of voltage.

In addition, in a case where a unit cell has a surge voltage and an operating voltage of 5.0 to 10.0V by properly designing the number of the electrodes 21 to 25, it is advantageous to the suppression of an increase in a leakage current and the stabilized use of voltage.

In the EDLC of the present invention, one or two or more unit cells are connected. Therefore, the EDLC can be usefully utilized for toys, UPSs, solar energy storage, an HEV power supply and the like as well as auxiliary power supplies, IC backup power supplies and the like of various electric and electronic devices.

Hereinafter, specific test examples of the present invention will be described. However, the following examples are provided only for illustrative purposes to explain the present invention in greater detail and are not intended to limit the scope of the present invention.

Example 1

A terminal 30 was drawn from each of typical activated carbon electrodes for an EDLC, and the electrodes were arbitrarily divided into a positive electrode 21 and a negative electrode 22. The two electrodes 21 and 22 were arranged parallel to each other. An additional bridge electrode 23 was then arranged to face the two electrodes 21 and 22 with a sheet of insulating paper interposed therebetween, thereby obtaining the laminate structure as shown in FIG. 5 (three electrodes, and the structure of FIG. 5). At this time, the electrodes 21, 22 and 23 were 0.017 cm in thickness and 3.1 cm in width. The positive electrode 21 and the negative electrode 22 among the electrodes 21, 22 and 23 were 5 cm in length, and the bridge electrode 23 was 10 cm in length. An interval d between the positive electrode 21 and the negative electrode 22 was about 10 mm. Thereafter, only the sheet of insulating paper was rotated about three revolutions in a winding machine with a winding core of a diameter of Ø3 in such a manner that the positive electrode 21 and the negative electrode 22 were not connected to each other, thereby preparing a cylindrical unit cell device. An electrolyte was injected into the device prepared as above and the device was then sealed with a rubber pad. Thus, a sample according to this example was completed.

Comparative Example 1

This comparative example is the same as Example 1 except that in preparing a cylindrical unit cell device, the two electrodes 2a and 2b were arranged opposite to each other with a sheet of insulating paper interposed therebetween as shown in FIG. 1 (two electrodes, and the structure of FIG. 1). At this time, the electrodes 2a and 2b were 0.017 cm in thickness, 3.1 cm in width, and 10 cm in length.

Thereafter, in the same manner as Example 1, the electrolyte was injected into the device prepared as above and the device was sealed with a rubber pad. Thus, a sample according to this comparative example was completed.

<Evaluation of Charge/Discharge Characteristic and Operating Voltage Stability>

In the samples according to Example 1 and Comparative Example 1, they were tested using a charge/discharge tester (TOSCAT-3100 available from Toyo System Co. Ltd., Japan) in view of capacitance on a voltage basis, capacitance on a discharge current basis, and the stability of an operating voltage in a discharge curve under the condition where charging was made up to a voltage of 5.0V with a current of 50 mA and 100 mA for 1 hour and discharge was then performed with 50 mA and 100 mA. The measurement results are shown in FIGS. 9 to 11.

Figure 9:
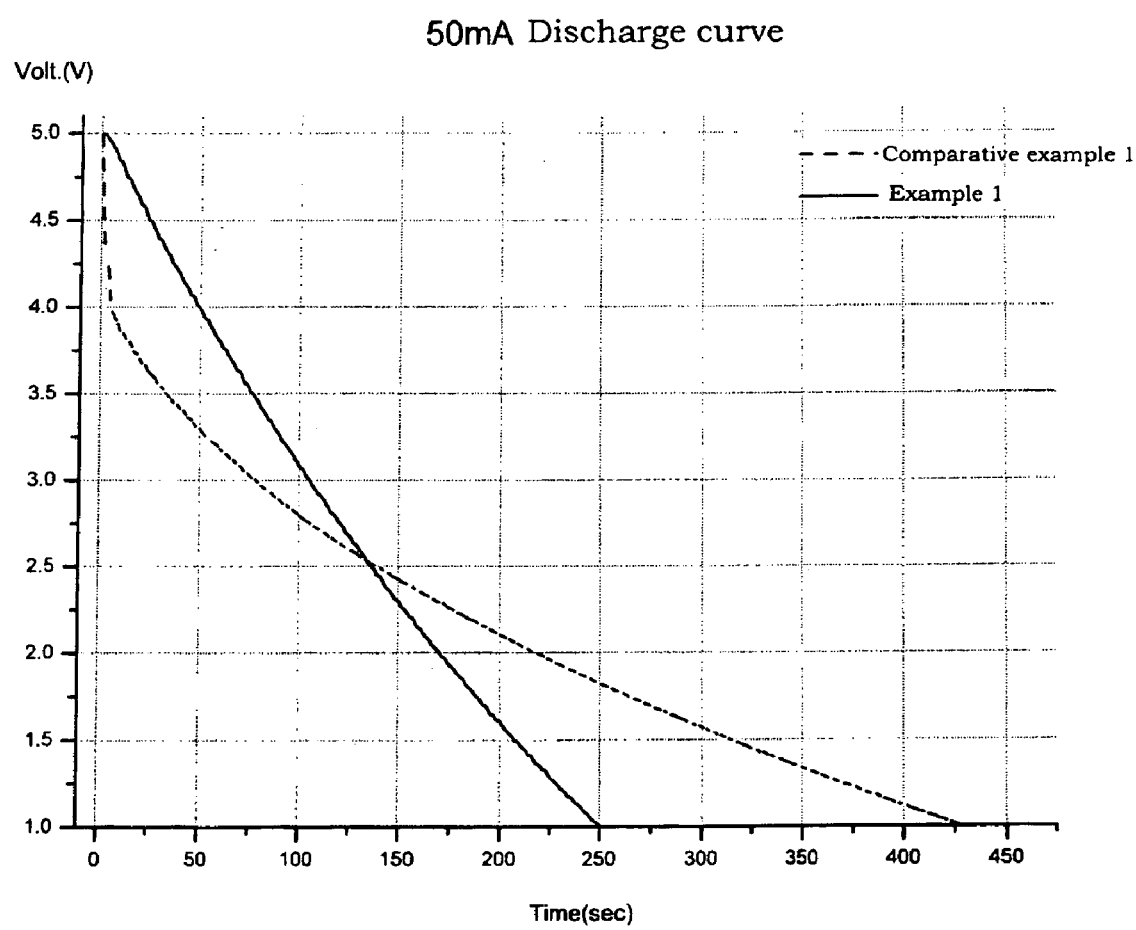
FIG. 9 is a 5.0V–50 mA discharge curve of a unit cell according to an example of the present invention.
Figure 10:
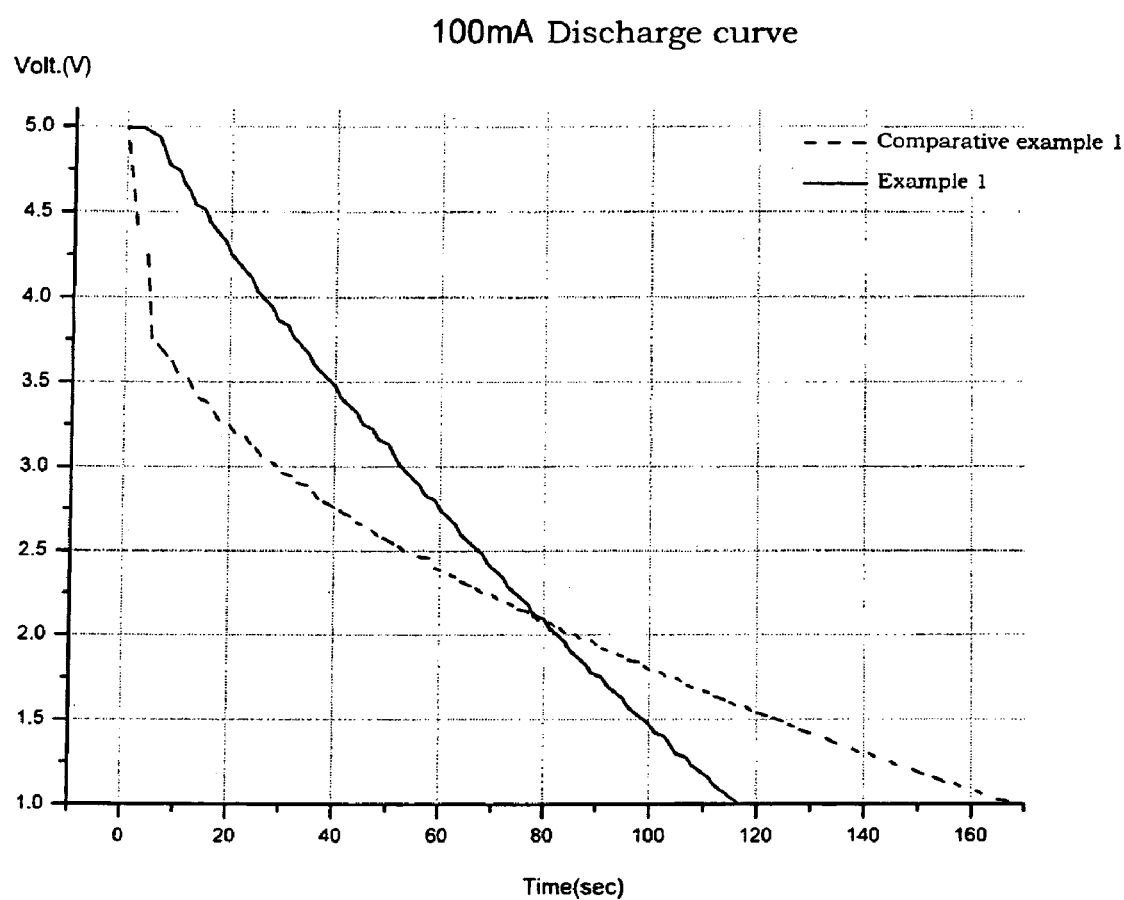
FIG. 10 is a 5.0V–100 mA discharge curve of a unit cell according to an example of the present invention.
Figure 11:
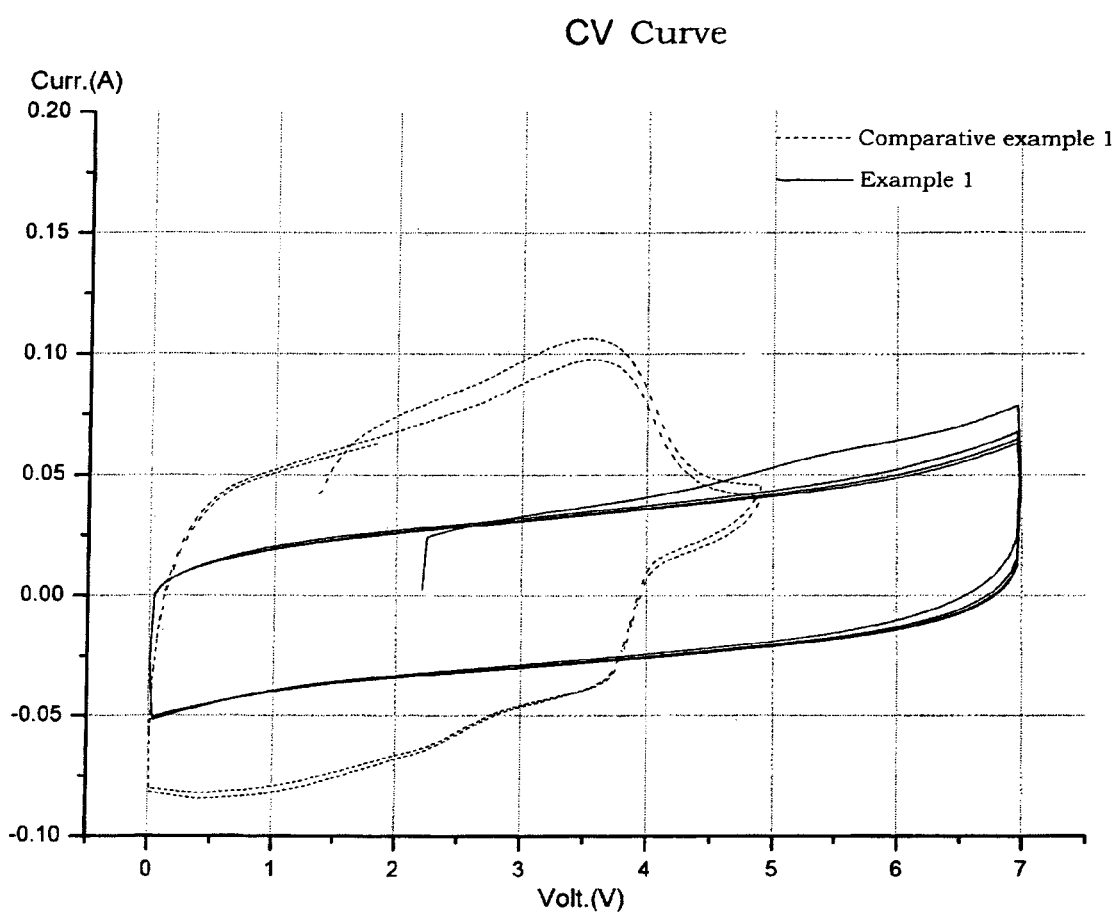
FIGS. 11 to 13 are C-V curves for voltage stability up to 7.0V in the unit cells according to the examples of the present invention.

FIGS. 9 and 10 show 50 mA and 100 mA discharge curves of the samples according to Example 1 (the structure of FIG. 5) and Comparative Example 1 (the structure of FIG. 1).

As shown in FIG. 9, when discharge began after the samples were charged up to 5.0V, the low voltage sample of Comparative Example 1 showed an abrupt voltage drop phenomenon to 4.0V, and normal constant-current discharge then began from 4.0V. However, the high voltage sample of Example 1 did not show a voltage drop at 5.0V and continued to keep normal constant-current discharge.

Furthermore, in the 100 mA discharge curve shown in FIG. 10, Comparative Example 1 showed an initial voltage drop phenomenon but then kept normal discharge from 3.5V. However, Example 1 showed normal 100 mA-discharge from 5.0V.

FIG. 11 is a C-V curve for the voltage stability of the samples according to Example 1 and Comparative Example 1 up to 7.0V.

It can be seen from FIG. 11 that Comparative Example 1 showed that an abrupt internal reaction occurred at 3.0V or more and the cell did not operate at 4.5V or more, whereas Example 1 showed that the voltage was stable from 6.0V to 7.0V.

Example 2

This example was the same as Example 1 except that in preparing a cylindrical unit cell device, electrodes were arranged as shown in FIG. 6 (four electrodes, and the structure of FIG. 6). At this time, the electrodes 21, 22, 23 and 24 were 0.017 cm in thickness, 3.1 cm in width, and 5 cm in length. An interval between the electrodes arranged parallel to each other was about 10 mm.

Figure 12:
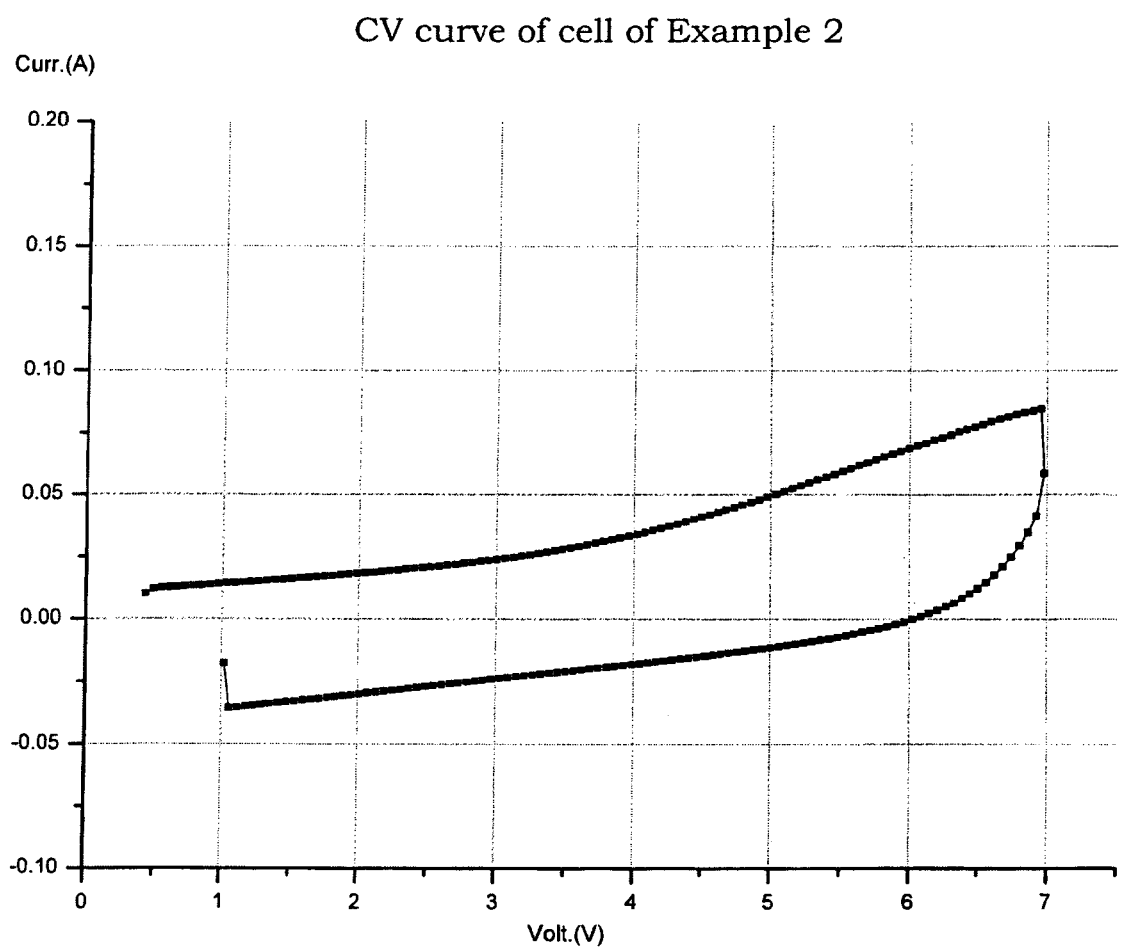

Thereafter, in the same manner as Example 1, the electrolyte was injected into the prepared device, and the device was sealed with a rubber pad, thereby completing a sample according to this example. A C-V curve of the sample up to 7.0V was measured in the same method as Example 1. The measurement results are shown in FIG. 12.

Example 3

This example was the same as Example 1 except that in preparing a cylindrical unit cell device, electrodes were arranged as shown in FIG. 7 (five electrodes, and the structure of FIG. 7). At this time, the electrodes 21, 22, 23, 24 and 25 were 0.017 cm in thickness, 3.1 cm in width, and 5 cm in length. An interval between the electrodes arranged parallel to each other was about 10 mm.

Thereafter, in the same manner as Example 1, the electrolyte was injected into the prepared device, and the device was sealed with a rubber pad, thereby completing a sample according to this example. A C-V curve of the sample up to 7.0V was measured in the same method as Example 1. The measurement results are shown in FIG. 13.

Figure 13:
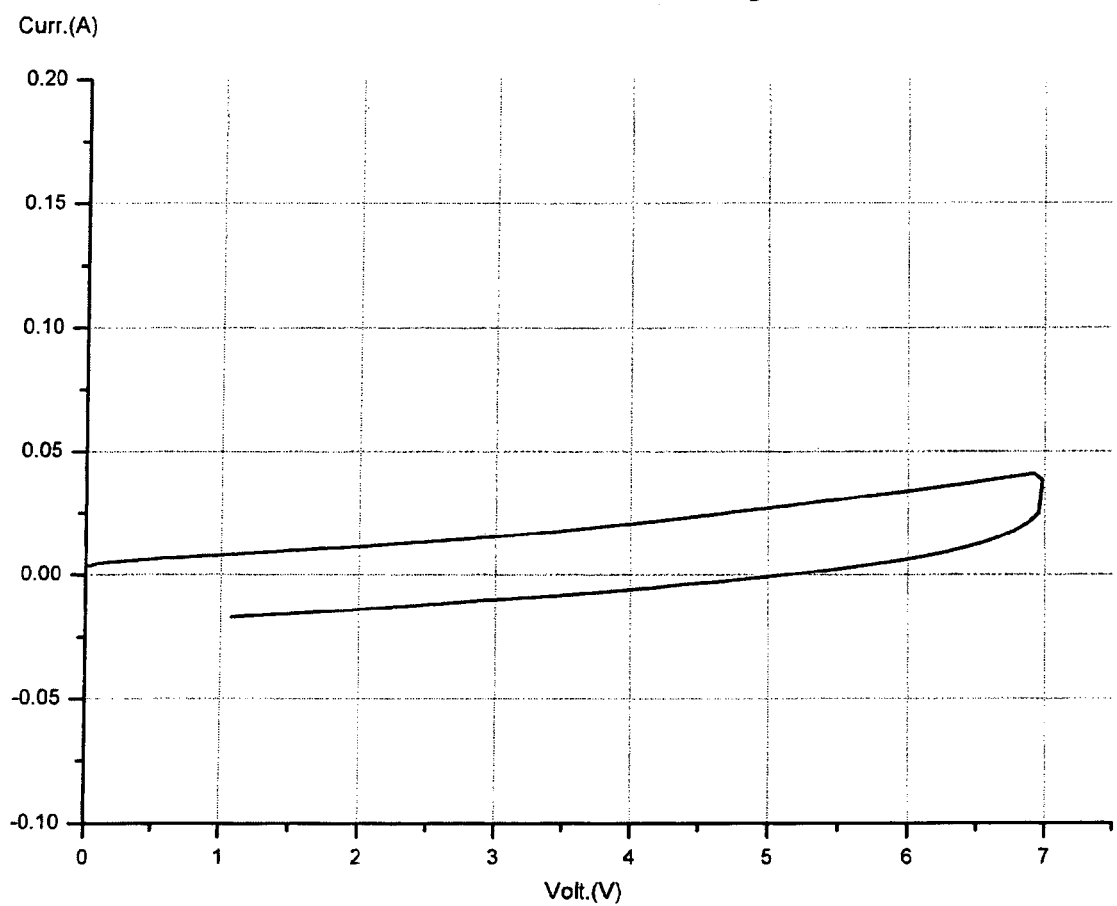

From FIG. 11 (Example 1, three electrodes), FIG. 12 (Example 2, four electrodes) and FIG. 13 (Example 3, five electrodes), it can be seen that the value of a current is gradually stabilized in the C-V curve if the number of the electrodes increases.

Furthermore, in order to confirm whether it is possible to expect capacitance values through control of the thickness, width and length of the electrode in preparing the samples of Example 1 (the structure of FIG. 5), Example 2 (the structure of FIG. 6) and Example 3 (the structure of FIG. 7), the capacitance values were expected on the basis of the length of the electrode and it was then confirmed through measurement on a voltage basis whether the expected capacitance values were correct, as shown in Tables 1, 2 and 3. At this time, a capacitance per volume of the electrode was 13.5 F/cc.

TABLE 1

<Measured Capacitance Based on Length of Electrode in Example 1>

| Example | Length of electrode | | | Thickness cm | Width cm | Volume of facing surface $cm^3$ | Expected capacitance F (2 sides in series) | 2 V F | 4 V F |
|---|---|---|---|---|---|---|---|---|---|
| | 21 in FIG. 5 | 22 in FIG. 5 | 23 in FIG. 5 | | | | | | |
| 1-1 | 5 cm | 5 cm | 10 cm | 0.017 | 3.1 | 0.527 | 7.11 (3.56) | 2.96 | 3.34 |
| 1-2 | 7.5 cm | 7.5 cm | 15 cm | 0.017 | 3.1 | 0.791 | 10.7 (5.35) | 4.81 | 5.34 |
| 1-3 | 10 cm | 10 cm | 21 cm | 0.017 | 3.1 | 1.054 | 14.23 (7.12) | 6.29 | 7.14 |
| 1-4 | 12.5 cm | 12.5 cm | 26 cm | 0.017 | 3.1 | 1.318 | 17.79 (8.90) | 7.90 | 8.87 |
| 1-5 | 15 cm | 15 cm | 31 cm | 0.017 | 3.1 | 1.581 | 21.34 (10.67) | 9.90 | 10.78 |

TABLE 2

<Measured Capacitance Based on Length of Electrode in Example 2>

| Example | Length of electrode | | | | Thickness cm | Width cm | Volume of facing surface cm³ | Expected capacitance F (3 sides in series) | 2 V F | 4 V F | 6 V F |
|---|---|---|---|---|---|---|---|---|---|---|---|
| | 21 in FIG. 6 | 22 in FIG. 6 | 23 in FIG. 6 | 24 in FIG. 6 | | | | | | | |
| 2-1 | 5 cm | 5 cm | 5 cm | 5 cm | 0.017 | 3.1 | 0.264 | 3.56 (1.19) | 0.91 | 1.06 | 1.17 |
| 2-2 | 7.5 cm | 7.5 cm | 7.5 cm | 7.5 cm | 0.017 | 3.1 | 0.395 | 5.34 (1.78) | 1.60 | 1.65 | 1.70 |
| 2-3 | 10 cm | 10 cm | 10 cm | 10 cm | 0.017 | 3.1 | 0.527 | 7.11 (2.37) | 2.11 | 2.13 | 2.19 |
| 2-4 | 12.5 cm | 12.5 cm | 12.5 cm | 12.5 cm | 0.017 | 3.1 | 0.659 | 8.89 (2.96) | 2.44 | 2.56 | 2.68 |
| 2-5 | 15 cm | 15 cm | 15 cm | 15 cm | 0.017 | 3.1 | 0.791 | 10.67 (3.56) | 2.90 | 3.05 | 3.31 |

TABLE 3

<Measured Capacitance Based on Length of Electrode in Example 3>

| Example | Length of electrode | | | | | Thickness cm | Width cm | Volume of facing surface cm³ | Expected capacitance F (4 sides in series) | 2 V F | 4 V F | 6 V F |
|---|---|---|---|---|---|---|---|---|---|---|---|---|
| | 21 in FIG. 7 | 22 in FIG. 7 | 23 in FIG. 7 | 24 in FIG. 7 | 25 in FIG. 7 | | | | | | | |
| 3-1 | 5 cm | 5 cm | 5 cm | 5 cm | 5 cm | 0.017 | 3.1 | 0.264 | 3.56 (0.89) | 0.67 | 0.67 | 0.86 |
| 3-2 | 7.5 cm | 7.5 cm | 7.5 cm | 7.5 cm | 7.5 cm | 0.017 | 3.1 | 0.395 | 5.34 (1.34) | 1.37 | 1.37 | 1.49 |
| 3-3 | 10 cm | 10 cm | 10 cm | 10 cm | 10 cm | 0.017 | 3.1 | 0.527 | 7.11 (1.78) | 1.59 | 1.63 | 1.86 |
| 3-4 | 12.5 cm | 12.5 cm | 12.5 cm | 12.5 cm | 12.5 cm | 0.017 | 3.1 | 0.659 | 8.89 (2.22) | 1.95 | 2.02 | 2.24 |

From Tables 1 to 3, it can be seen that when the length of the electrode increases by integral multiple, two capacitances are generated from the facing surfaces and serial connection capacitance of a condenser reduces to a half. Furthermore, from Table 1, it can be seen that when in case of three electrodes, i.e., two electrode-facing surfaces S, capacitance upon charging to 4V rather than capacitance upon charging to 2V has a similar value to an expected capacitance. From Table 2, it can be seen that in case of four electrodes, i.e., three electrode-facing surfaces S, capacitance upon charging to 6V rather than capacitance upon charging to 2V has a similar value to an expected capacitance. This fact can be considered to demonstrate that a rating voltage is 4V or more according to the number of the electrode-facing surfaces S.

Therefore, as shown in FIGS. 9 and 10, in Example 1 of the present invention, upon discharge after charging, constant-current discharge begins at 5.0V that is a cut-off voltage of the charging. In conventional Comparative Example 1, however, even after charging to 5.0V, discharge begins after a voltage drop of 1.0V occurs down to about 4.0V. That is, in conventional Comparative Example 1, even though charging can be made, a voltage drop occurs upon start of discharge. This means that the voltage stability of Example 1 is more stable than Comparative Example 1.

Furthermore, from the above results, it can be seen that there is a problem in a normal current discharge due to the capacitor when charging and discharge occur at a voltage higher than a rating voltage in case of conventional Comparative Example 1, and the lifespan of the capacitor may be severely shortened due to a critical voltage drop. On the contrary, it can be said that in case of Example 1 of the present invention in which voltage is stable, a surge voltage and an operating voltage are high since the capacitor has a stable charge/discharge curve up to 5.0V.

Meanwhile, from FIG. 11 showing the C-V curve, it can be seen that Example 1 of the present invention has a more stable current value without a change in an internal current up to 7.0V as compared to Comparative Example 1.

According to the present invention, it is possible to design the capacitance of an EDLC by confirming the actual capacitance value of the EDLC, which is designed to have an expected capacitance value, through changes in the length of an electrode as shown in Tables 1 to 3. It can also be found that reducing the capacitance value of facing surfaces to ½ or ⅓ has the same effects as increasing a voltage twice and reducing capacitance to a half, through external serial connection.

According to the present invention, the thickness, width and length of an electrode are calculated, and the number of electrode-facing surfaces is arbitrarily designed through control of the number of electrodes within a unit cell. Thus, it is possible to induce various values of internal voltage and capacitance according to the design values. Accordingly, the present invention has an advantage in that a high energy storage density can be obtained by increasing a surge voltage and an operating voltage in response to the designed number of electrodes.

Furthermore, according to the present invention, an EDLC with a single cell can have an operating voltage applicable to products. This can shorten the manufacturing process of classifying unit cells based on the capacitance, resistance and leakage current of a unit cell for use in fabricating a module. Further, there are advantages in that it is possible to eliminate the process of repeatedly measuring electrical performance such as the capacitance, resistance and leakage current of the module after the fabrication thereof, and an EDLC module can be miniaturized. In addition, there is an advantage in that there is no need for a protection circuit for maintaining voltage balance on a unit cell basis upon fabrication of the module.

What is claimed is:

1. An electric double layer capacitor having a unit cell constructed by alternately laminating electrodes and sheets of insulating paper and impregnating an electrolyte therein, wherein the unit cell is constructed by sequentially laminating a first insulating paper layer with a sheet of insulating paper, a first electrode layer with at least two electrodes, a second insulating paper layer with a sheet of insulating paper, and a second electrode layer with at least one electrode parallel to the at least two electrodes, and an interval between the at least two electrodes is 0.5 mm to 20 mm.

2. The electric double layer capacitor as claimed in claim 1, wherein a surge voltage an operating voltage of the unit cell are 5.0 to 10.0V.

3. The electric double layer capacitor as claimed in claim 1, wherein the electric double layer capacitor has one unit cell (single cell).

4. An electric double layer capacitor having a unit cell constructed by alternately laminating electrodes and sheets of insulating paper and impregnating an electrolyte therein, wherein the unit cell is constructed by sequentially laminating a first insulating paper layer with a sheet of insulating paper, a first electrode layer with at least one electrode, a second insulating paper layer with a sheet of insulating paper, and a second electrode layer with at least two electrodes parallel to the at least on electrodes, and an interval between the at least two electrodes is 0.5 mm to 20 mm.

5. The electric double layer capacitor as claimed in claim 4, wherein a surge voltage and an operating voltage of the unit cell are 5.0 to 10.0V.

6. The electric double layer capacitor as claimed in claim 4, wherein the electric double layer capacitor has one unit cell (single cell).

* * * * *